US007932488B2

(12) United States Patent
Javahery et al.

(10) Patent No.: US 7,932,488 B2
(45) Date of Patent: Apr. 26, 2011

(54) CONCENTRATING MASS SPECTROMETER ION GUIDE, SPECTROMETER AND METHOD

(76) Inventors: Gholamreza Javahery, Kettleby (CA); Lisa Cousins, Woodbridge (CA); Charles Jolliffe, Schomberg (CA); Ilia Tomski, Concord (CA)

( * ) Notice: Subject to any disclaimer, the term of this patent is extended or adjusted under 35 U.S.C. 154(b) by 128 days.

(21) Appl. No.: 12/437,203

(22) Filed: May 7, 2009

(65) Prior Publication Data

US 2009/0218484 A1 Sep. 3, 2009

Related U.S. Application Data

(62) Division of application No. 11/331,153, filed on Jan. 13, 2006, now Pat. No. 7,569,811.

(51) Int. Cl.
*B01D 59/44* (2006.01)
*H01J 49/42* (2006.01)

(52) U.S. Cl. ......... 250/282; 250/290; 250/292; 250/293

(58) Field of Classification Search .................. 250/281, 250/282, 286, 288, 290, 292, 293
See application file for complete search history.

(56) References Cited

U.S. PATENT DOCUMENTS

| | | | | |
|---|---|---|---|---|
| 4,234,791 | A | 11/1980 | Enke et al. | |
| 4,963,736 | A | 10/1990 | Douglas et al. | |
| 5,248,875 | A | 9/1993 | Douglas et al. | |
| 5,521,382 | A | 5/1996 | Tanaka et al. | |
| 5,847,386 | A | 12/1998 | Thomson et al. | |
| 6,107,628 | A | 8/2000 | Smith et al. | |
| 6,111,250 | A | 8/2000 | Thomson et al. | |
| 6,417,511 | B1 * | 7/2002 | Russ et al. | 250/292 |
| 6,462,338 | B1 | 10/2002 | Inatsugu et al. | |
| 6,700,119 | B1 | 3/2004 | Giles | |
| 6,730,904 | B1 | 5/2004 | Wells | |
| 6,744,043 | B2 | 6/2004 | Loboda | |
| 6,753,523 | B1 | 6/2004 | Whitehouse et al. | |
| 6,872,938 | B2 | 3/2005 | Makarov et al. | |
| 6,919,562 | B1 * | 7/2005 | Whitehouse et al. | 250/288 |
| 7,034,292 | B1 * | 4/2006 | Whitehouse et al. | 250/289 |
| 7,049,584 | B1 * | 5/2006 | Whitehouse et al. | 250/288 |
| 7,439,498 | B2 | 10/2008 | Litherland et al. | |
| 7,449,687 | B2 | 11/2008 | Li | |

(Continued)

FOREIGN PATENT DOCUMENTS

CA 2447057 A1 5/2004

(Continued)

OTHER PUBLICATIONS

McFarland, Melinda A. et al., "'Ion Thrashing': Collisionally Activated Dissociation in an External Octopole Ion Trap by Oscillation an Axial Electric Potential Gradient", Anal. Chem., 2004, pp. 1545-1549, vol. 76.

(Continued)

*Primary Examiner* — Bernard E Souw

(57) ABSTRACT

An ion guide includes multiple stages. An electric field within each stage guides ions along a guide axis. Within each stage, amplitude and frequency, and resolving potential of the electric field may be independently varied. The geometry of the rods maintains a similarly shaped field from stage to stage, allowing efficient guidance of the ions along the axis. In particular, each rod segment of the $i^{th}$ of stage has a cross sectional radius $r_i$, and a central axis located a distance $R_i+r_i$ from the guide axis. The ratio $r_i/R_i$ and is substantially constant along the guide axis, thereby preserving the shape of the field.

10 Claims, 9 Drawing Sheets

U.S. PATENT DOCUMENTS

| | | | | |
|---|---|---|---|---|
| 7,569,811 | B2 * | 8/2009 | Javahery et al. | 250/282 |
| 2003/0222213 | A1 | 12/2003 | Taniguchi | |
| 2004/0195503 | A1 * | 10/2004 | Kim et al. | 250/288 |
| 2007/0187614 | A1 | 8/2007 | Schneider et al. | |
| 2008/0265154 | A1 | 10/2008 | Cousins et al. | |
| 2009/0127455 | A1 * | 5/2009 | Kim et al. | 250/288 |
| 2010/0171035 | A1 * | 7/2010 | Okumura et al. | 250/289 |

FOREIGN PATENT DOCUMENTS

| | | | |
|---|---|---|---|
| DE | 19941670 | A1 | 3/2000 |
| DE | 10350664 | A1 | 9/2004 |

OTHER PUBLICATIONS

Javahery, Gholamreza and Bruce Thomson, "A Segmented Radiofrequency-Only Quadrupole Collision Cell for Measurements of Ion Collision Cross Section of a Triple Quadrupole Mass Spectrometer", Journal of Americal Society for Mass Spectrometry, 1997, pp. 697-702, vol. 8, Elsevier Science Inc.

March, Raymond E. and John F. Todd, eds., "Practical Aspects of Ion Trip Mass Spectrometry, vol. 1: Fundamentals, Modern Mass Spectrometry Series", CRC Series Modern Mass Spectrometry, 1995, pp. 10, 210-213, CRC Press: Boca Raton, Florida.

March, Raymond E. and John F. Todd eds., "Practical Aspects of Ion Trap Mass Spectrometry, vol. 2: Ion Trap Instrumentation," CRC Series Modern Mass Spectrometry, 1995, pp. 90-95, CRC Press: Boca Raton, Florida.

Ashcroft, Alison E., "Ionization Methods in Organic Mass Spectrometry", The Royal Society of Chemistry Analytical Spectroscopy Monographs, 1997, pp. 20-26, 61-65, 74-83, 98-106, 122-127, 132-139, The Royal Society of Chemistry, Cambridge, U.K.

Dehmelt, H.G., "Radiorequency Spectroscopy of Stored Ions I: Storage", Advances in Atomic Physics 3, 1967, pp. 53-72.

Zubarev, Roman A. et al., "Electron Capture Dissociation of Multiply Charged Protein Cations. A nonergodic Process", American Chemical Society, 1998, pp. 3265-3266, vol. 120.

Gerlic, Dieter, "Inhomogeneous RF Fields" A Versitile Tool for the Study of Processes with Slow Ions, Advances in Chemical Physics, 1992, pp. 1-176, vol. 82, John Wiley & Sons.

Mason, Edward A. and Earl W. McDaniel, "Transport Properties of Ions in Cases", 1998, pp. 11-27, 468-479, John Wiley & Sons, New York.

Herron, William J. et al., "Reactions of Polyatomic Dianions with Cations in the Paul Trap", Rapid Commun. Mass Spectrometry, 1996, pp. 277-281, vol. 10, John Wiley & Sons.

Cole, Richard B. ed., "Electrospray ionization Mass Spectrometry, Fundamentals, nstrumentaion and Applications", May 1997, pp. 179-196, 204-230, 244-250, John Wiley & Sons, New York.

International Search Report for International Patent Application No. PCT/CA2007/000049, filed Jan. 11, 2007.

Office Action issued Nov. 2, 2010 in related German Patent Application No. 11 2007 000 146.1-54.

* cited by examiner

CONCENTRATING MASS SPECTROMETER ION GUIDE, SPECTROMETER AND METHOD

CROSS-REFERENCE TO RELATED APPLICATIONS

This application is a divisional of co-pending U.S. patent application Ser. No. 11/331,153 filed Jan. 13, 2006, now U.S. Pat. No. 7,569,811 entitled "CONCENTRATING MASS SPECTROMETER ION GUIDE, SPECTROMETER AND METHOD", the contents of which are hereby incorporated herein by reference.

FIELD OF THE INVENTION

The present invention relates generally to mass spectrometry, and more particularly to ion guides used in mass spectrometers.

BACKGROUND OF THE INVENTION

Mass spectrometry has proven to be an effective analytical technique for identifying unknown compounds and determining the precise mass of known compounds. Advantageously, compounds can be detected or analyzed in minute quantities allowing compounds to be identified at very low concentrations in chemically complex mixtures. Not surprisingly, mass spectrometry has found practical application in medicine, pharmacology, food sciences, semi-conductor manufacturing, environmental sciences, security, and many other fields.

A typical mass spectrometer includes an ion source that ionizes particles of interest. The ions are passed to an analyser region, where they are separated according to their mass (m)-to-charge (z) ratios (m/z). The separated ions are detected at a detector. A signal from the detector is sent to a computing or similar device where the m/z ratios are stored together with their relative abundance for presentation in the format of a m/z spectrum.

Typical ion sources are exemplified in "Ionization Methods in Organic Mass Spectrometry", Alison E. Ashcroft, The Royal Society of Chemistry, UK, 1997; and the references cited therein. Conventional ion sources may create ions by atmospheric pressure chemical ionisation (APCI); chemical ionisation (CI); electron impact (EI); electrospray ionisation (ESI); fast atom bombardment (FAB); field desorption/field ionisation (FD/FI); matrix assisted laser desorption ionisation (MALDI); or thermospray ionization (TSP).

Ionized particles may be separated by quadrupoles, time-of-flight (TOF) analysers, magnetic sectors, Fourier transform and ion traps.

The ability to analyse minute quantities requires high sensitivity. High sensitivity is obtained by high transmission of analyte ions, and low transmission of non-analyte ions and particles, known as chemical background.

An ion guide guides ionized particles between the ion source and the analyser/detector. The primary role of the ion guide is to transport the ions toward the low pressure analyser region of the spectrometer. Many known mass spectrometers produce ionized particles at high pressure, and require multiple stages of pumping with multiple pressure regions in order to reduce the pressure of the analyser region in a cost-effective manner. Typically, an associated ion guide transports ions through these various pressure regions.

One approach to obtain high sensitivity is to use large entrance apertures, and smaller exit apertures, to transport ions from regions of higher pressure to lower pressure.

Vacuum pumps and multiple pumping stages reduce the pressure in a cost-effective way. Thus, the number of ions entering the analyser region is increased, while the total gas load along various pressure stages is decreased. Often the ion guide includes several such stages of accepting and emitting the ions, as the beam is transported through various vacuum regions and into the analyser.

For high sensitivity low ion losses at each stage are desirable. Therefore it is advantageous to reduce the radius of the ion beam, to produce a small beam diameter at the exit, from a large initial beam diameter at the entrance aperture. That is, the maximum radial excursion of a set of individual ions in the ion beam is reduced as the ions traverse axially along the ion path before the exit, thereby concentrating the ion beam. Generally, the more concentrated the beam entering the analyser, the higher the desired ion flux and the greater the overall sensitivity of the mass spectrometer.

One typical guide includes multiple parallel rods, with nearly equal size entrance and exit apertures. Typically four, six, eight, or more, rods, are arranged in quadrupole, hexapole, or the like. A DC voltage with a superimposed high frequency RF voltage is applied to the rods. The frequency and amplitude of the applied voltage is the same for all rods, but the phases of the high frequency voltages of adjacent rod electrodes are reversed. Another conventional RF ion guide is formed as a set of parallel rings or plates with apertures. Again, RF and DC voltages are applied to the rings or plates.

These conventional ion guides provide additional functionality at moderate pressure, such as ion mobility separation by the application of an axial drift field (as, for example, G. Javahery and B. Thomson, J. Am. Soc. Mass. Spectrom. 8, 692 (1997)); and ion trapping (Raymond E. March, John F. J. Todd, Practical Aspects of Ion Trap Mass Spectrometry: Volume 2: Ion Trap Instrumentation, CRC Press Boca Raton, Fla. 1995). Further, quadrupole ion guides allow for mass-to-charge selective excitation and ejection by use of resonant excitation methods.

Commonly, in RF ion guides at moderate pressures, collisions of ions with background gas cause some reduction of the radial amplitude, and help to concentrate the ion beam near the exit. (as for example detailed in U.S. Pat. No. 4,963,736 and R. E. March and J. F. J. Todd (Eds.), 1995, Practical Aspects of Ion Trap Mass Spectrometry: Fundamentals, Modern Mass Spectrometry Series, vol. 1. (Boca Raton, Fla.: CRC Press)).

However, it is not always possible to efficiently concentrate an ion beam at the entrance or exit of a conventional RF ion guide. For example, as the ion and gas exit a high pressure region into a lower pressure region, through a large aperture, the ion beam may be entrained in a flow of high density gas. The ions in the high density gas cannot be readily guided or concentrated. Ions may be scattered in the high density gas, and lost to the rod electrodes. At the exit, the degree to which the ion beam may be concentrated is limited at least partly by the pressure and RF voltage, in practice for electrical reasons such as discharge and creep.

Although some existing RF ion guides do further concentrate the ion beam, they have disadvantages due to their geometries. These ion guides include one or more sets of plates or discs, with variable apertures, separated by gaps, with unequal size entrance and exit apertures. The geometries typically result in distortions of the electric field that reduce the sensitivity of the mass spectrometer. This problem can be acute in ion guides that accumulate ions in guided ion beams. Typically, stored ions are passed back and forth through the ion guide prior to ejection, sometimes many times. Poorly defined electric fields can induce losses in transmission as ions undergo repeated passes, causing the ions to escape from or collide with the guide. Similarly ion separation on the basis of mobility is less effective due to broadening of the ion separation time and diffusion losses. Finally, these ion guides do not preserve ion motion by maintaining or incrementally varying the ions' oscillatory frequency as they travel through the guide, reducing mass-to-charge selective excitation methods.

Thus, there exists a need for an ion guide and method that reduces the radius of travel of the ion beam about a guide axis, and also combines some of the benefits with few of the disadvantages associated with the conventional ion guides and techniques. Such a device and method would improve the sensitivity and usefulness of the mass spectrometer and have wide applicability and higher sensitivity than conventional ion guides and methods that are commonly available.

SUMMARY OF THE INVENTION

Therefore it is an object of the invention to provide a higher sensitivity concentrating ion guide that efficiently captures and reduces the radius of a wide diameter beam of ions entrained in a gas.

In accordance with the present invention, an ion guide includes multiple stages. An electric field within each stage, guides ions along a guide axis. Within each stage, amplitude and frequency, and resolving potential of the electric field may be independently varied. The geometry of the rods maintains a similarly shaped field from stage to stage, allowing efficient guidance of the ions along the axis. In particular, each rod segment of the $i^{th}$ of stage has a cross sectional radius $r_i$, and a central axis located a distance $R_i+r_i$ from the guide axis. The ratio $r_i/R_i$ is substantially constant along the guide axis, thereby preserving the shape of the field.

In accordance with an aspect of the present invention there is provided an ion guide, including n stages extending along a guide axis. Each of the n stages includes a plurality of opposing elongate conductive rod segments arranged about the guide axis. Each of the elongate conductive rod segments of the $i^{th}$ of the n stages has a length $l_i$, a cross sectional radius $r_i$, and a central axis a distance $R_i/r_i$ from the guide axis. A voltage source, provides a voltage having an AC component between two adjacent ones of the plurality of opposing elongate conductive rod segments of each of the stages to produce an alternating electric field to guide ions along the guide axis. $r_i/R_i$ is substantially constant along the guide axis and $R_i$ for at least two of the stages are different.

In accordance with another aspect of the present invention, there is provided an ion guide including a plurality of opposing elongate, at least partially conductive rod segments arranged about a guide axis to produce an alternating electric field therebetween. Each of the elongate rod segments has a substantially circular cross-section having radius r(x) and centered at a position r(x)+R(x) from the guide axis, wherein x represents a position x along the guide axis, and wherein r(x)/R(x) is substantially constant for values of x along the guide axis.

In accordance with yet another aspect of the present invention, there is provided a method of guiding ions of selected m/z ratios within an ion guide along a guide axis. The method includes: providing a plurality of guide stages arranged along the guide axis; within each of the plurality of guide stages, generating an alternating electric field that guides the ions along the guide axis, and confines ions of selected m/z ratios within a radius about the guide axis in each of the stages. The radius is sequentially reduced from stage to stage along the guide axis. At least one of the amplitude and frequency of the electric field within each stage varies from the amplitude and frequency within an adjacent stage.

Conveniently, an exemplary ion guide provides a high sensitivity guide that maintains well-defined electric fields.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
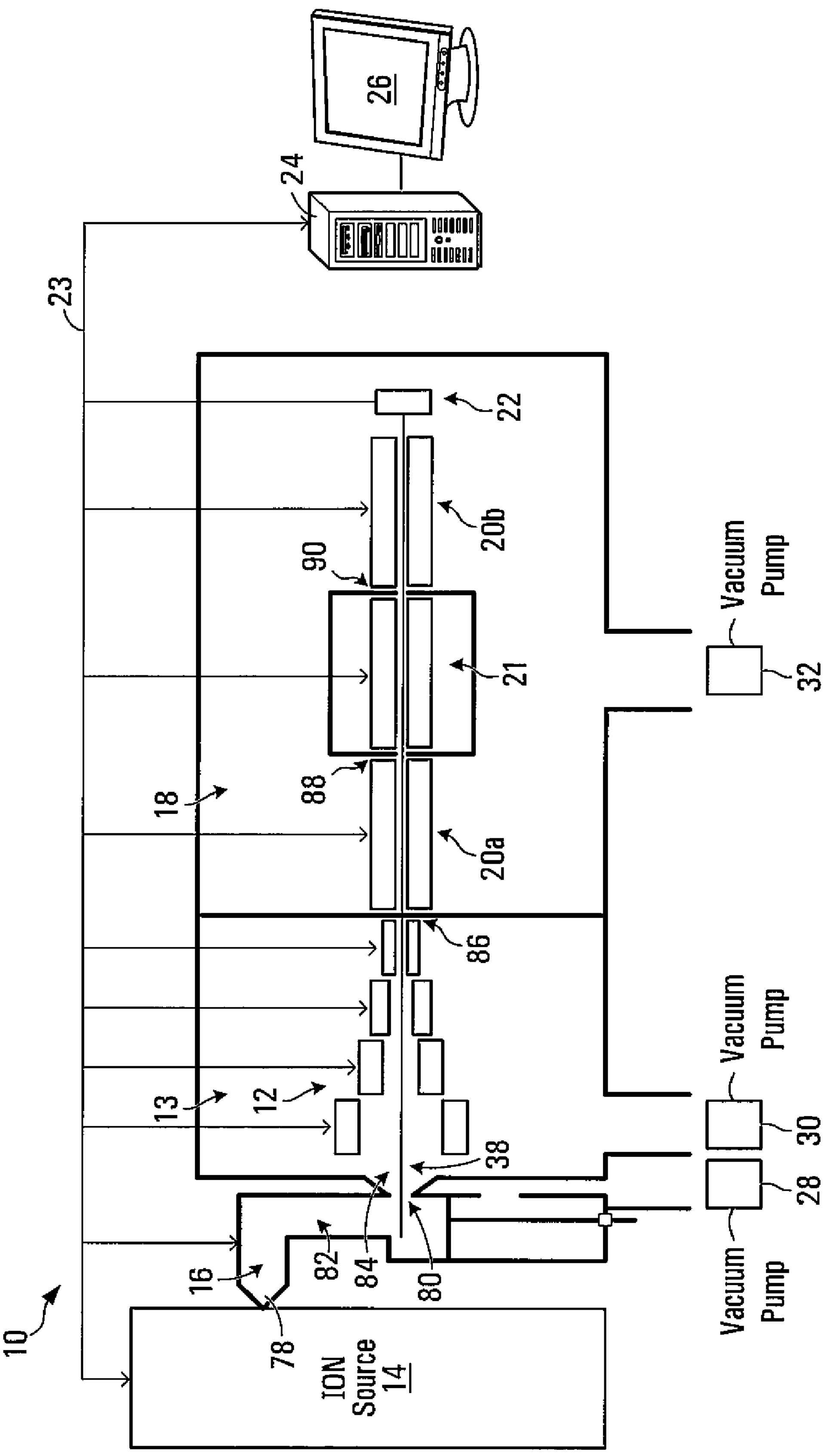
FIG. 1 is a simplified schematic diagram of a mass spectrometer, exemplary of an embodiment of the present invention.

FIG. 1 illustrates an exemplary mass spectrometer 10, including an ion guide 12 exemplary of an embodiment of the present invention. As illustrated, mass spectrometer 10 includes an ion source 14, providing ions to a low pressure interface 16, through an orifice 78. Low pressure interface 16 provides ions to ion guide 12, by way of orifice 80. Exiting ions and other particles are provided to by way of an orifice 86 to an analyser region 18 that includes quadrupole mass filters 20*a* and 20*b* and a pressurized collision cell 21. Ions exiting mass filters 20*b* impact ion detector 22.

A computing device 24, including a data acquisition and control interface is in communication with ion detector 22 and control lines 23. Computing device 24 is under software control. Computed results are displayed by device 24 on interconnected display 26.

Vacuum sources 28, 30 and 32 evacuate various portions of mass spectrometer 10, as detailed below. Ion guide 12, thus guides ions from a first region of higher pressure, proximate interface 16, evacuated by vacuum pump 28, through a second region of a lower pressure, 13 evacuated by vacuum pump 30, to a third region of even lower pressure, 18, evacuated by vacuum pump 32.

Ion source 14, low pressure interface 16, analyzer region 18, detector 22, computing device 24 control lines 23 and vacuum source 28, 30 and 32 may all be conventional. In the depicted embodiment, ion source 14 may for example take the form of an APCI, ESI, APPI, or MALDI source. Analyser region 18 is formed using mass filters 20*a* and 20*b* but could be formed as a time-of-flight (TOF) analyser, magnetic sector, Fourier transform or quadrupole ion trap or other suitable mass analyser understood by those of ordinary skill. As such, ion source 14, analyser region 18, detector 22, computing device 24 and vacuum sources 28, 30 and 32 will not be described in detail.

Software governing operation of computing device 24 may be exemplary of embodiments of the present invention. Example structures and function of such software will become apparent.

Example ion sources, low pressure interfaces, mass filters, vacuum sources, detectors and computing devices suitable for use in spectrometer 10 are further described in "Electrospray Ionization Mass Spectrometry, Fundamentals, Instrumentation & Applications" edited by Richard B. Cole (1997) ISBN 0-4711456-4-5 and documents referenced therein.

Figure 2:
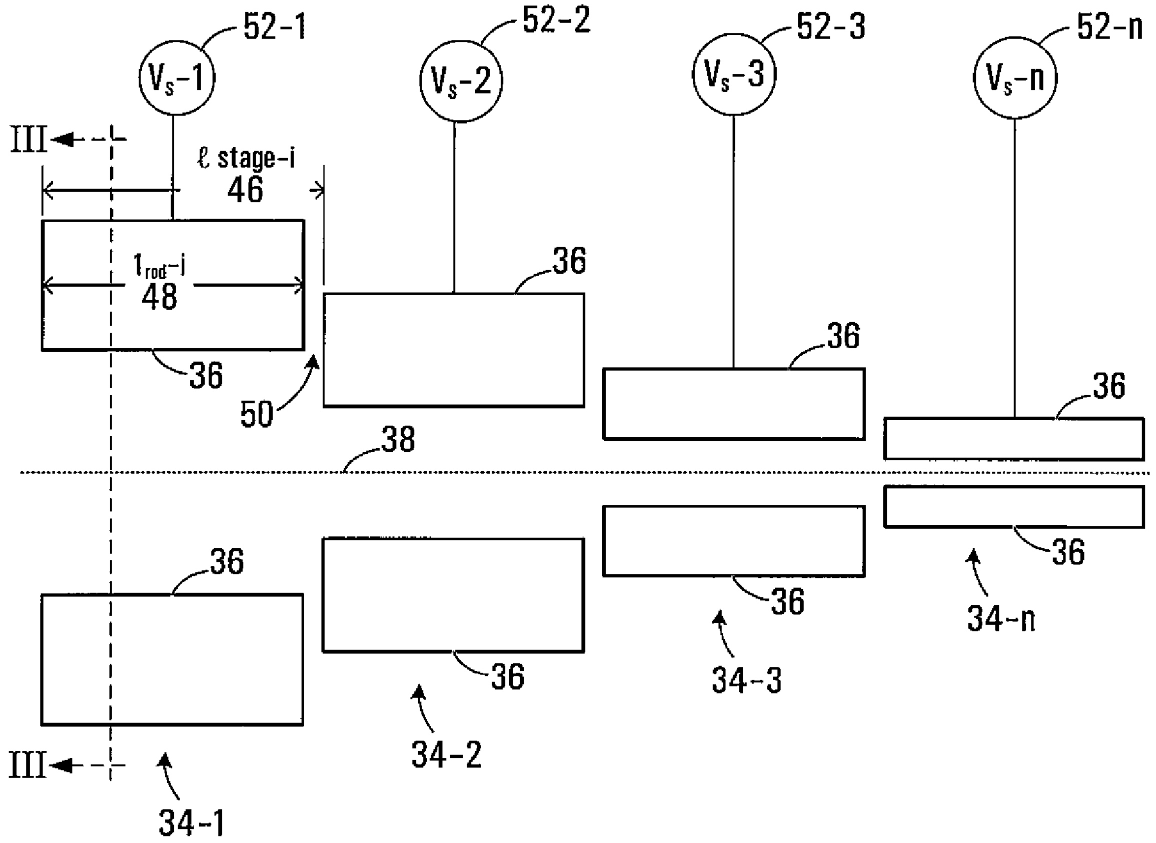
FIG. 2 is a simplified schematic diagram of an ion guide exemplary of an embodiment of the present invention.

FIG. 2 is a simplified schematic diagram of exemplary ion guide 12. As illustrated, ion guide 12 includes several stages 34-1, 34-2 . . . 34-*i* . . . 34-*n* (individually and collectively, stages 34). Each stage 34 includes four rod segments 36*a*, 36*b*, 36*c* and 36*d* (individually and collectively, rod segment 36) arranged in quadrupole about a guide axis 38, common to all stages 34, as illustrated in FIG. 3.

As depicted, separate voltage sources 52-1, 52-2, 52-3, and 52-*n*, (individually and collectively source(s) 52), respectively provide a potential $V_s$-1, $V_s$-2, $V_s$-3 . . . $V_s$-n across rod segments 36 of stages 34-1, 34-2, 34-3, . . . 34-*n*. As will be appreciated, multiple voltage sources may be used.

In order to concentrate ions as they pass along axis 38, rod segments 36 of ion guide 12 within each stage 34 are radially closer from stage to stage, as illustrated in FIG. 2. That is $R_{i+1} \leqq R_i$ for each of the n stages.

Figure 3:
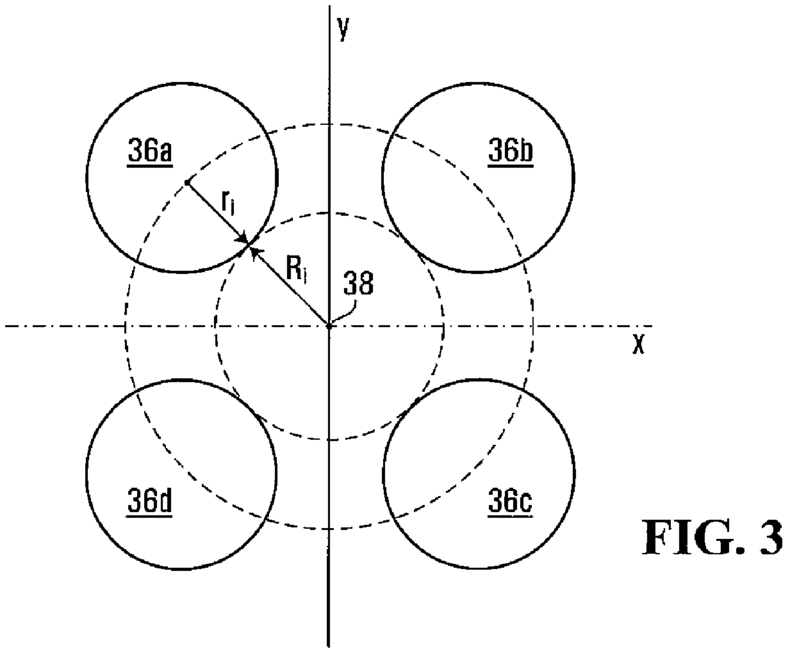
FIG. 3 is a cross-sectional view of the ion guide of FIG. 2.

As illustrated in FIG. 3 rod segments 36 within a stage 34 are angularly separated by 90 degrees about guide axis 38. The radius of rod segments 36 within the $i^{th}$ stage is $r_i$, and the circumscribed radius defined by segments 36 is $R_i$. Exemplary $R_i$ and $r_i$ may be in the range of about 2 mm to 30 mm. Rod segments 36 of each stage are arranged in parallel, with their central axes about a circle centred along guide axis 38, at a distance $R_i+r_i$ from this axis 38. In general, the shape and configuration of rod segments 36 for any stage 34 determines the shape of the electric potential, in the area between rod segments 36.

Optionally, instead of being arranged in quadrupole, rod segments (like segments 36) could be arranged in multipole with 2n>4 rods, and constant $r_i/R_i$, with $R_{i+1}<R_i$. For example, for six rods (i.e. three pairs), a hexapolar field is produced; for eight rods (four pairs), an octopolar field. Higher numbers (e.g. five pairs or more) of rods could similarly be used. All provide a containment field for ions. The resulting time varying electric field will be correspondingly quadrupolar, hexapolar, octopolar, or the like.

The general form for the alternating electric potential applied across 2n adjacent rods may be expressed in Cartesian coordinates as:

$$\phi = \phi_o\left[\frac{x^2+y^2}{R_i^2}\right]^{n/2}\cos(n\varphi) \tag{1}$$

where $\phi_o$ is the applied time dependent voltage, $\phi$=arctan (y/x) and n is the number of rod pairs (as discussed by Gerlich, Inhomogeneous Rf-Fields—A Versatile Tool For The Study Of Processes With Slow Ions, Advances In Chemical Physics 82: 1-176 1992). Commonly, ion guides are constructed of round rods of radius r. In order to approximate Eqn. (1), the relationship of rod radius $r_i$ to circumscribed radius $R_i$ for 2n equally spaced rod segments having a round cross section is to first order, as given by $$R_i=(n-1)r_i \tag{2}$$

so that for n=2, $R_i \sim r_i$, n=3, $R_i \sim 2r_i$; n=4, $R_i \sim 3r_i$, etc. For a quadrupole ion guide, $r_i/R_i$ has been calculated for example as 1.148, to minimize field distortions and to provide substantially quadrupolar fields (as discussed in "Quadrupole Mass Spectrometry and its Applications". (1995) Peter H. Dawson, ed., American Institute of Physics Press, Woodbury, New York, N.Y., 1995, pg. 129). In practice, the ratio can be adjusted experimentally to achieve the desired performance characteristics.

Specifically, for a quadrupole ion guide, potential $\phi$ is applied across adjacent rod segments 36, where $$\phi = \frac{\phi_o(x^2-y^2)}{2R_i}, \tag{3}$$

$$\phi_o = U_b - V_{ac}\cos(\Omega t), \tag{4}$$

$U_b$ is a DC voltage, $V_{ac}\cos\Omega t$ is an RF voltage of amplitude $V_{ac}$, oscillating with angular frequency $\Omega=2\pi f$, with radial excursions along x and y axes, as defined in Dawson (supra). Typically $\phi$ is applied to four rods such that one opposing set of rods receives the DC voltage, $U_b$, and the RF voltage, of amplitude $V_{ac}$, and the other set of rods receives opposite polarity voltage $-U_b$, and the opposite phase of RF of amplitude $V_{ac}$. Then the equations of motion of ions along axis 38 for any stage 34 can be solved analytically using the Mathieu equation, and ions can be efficiently transmitted, ejected or separated on the basis of their mass-to-charge, thereby providing m/z selection capabilities.

The solution yields the Mathieu parameters a and q $$a = \frac{4zU_b}{m\Omega^2R_i^2} \tag{5}$$

$$q = \frac{8zV_{ac}}{m\Omega^2R_i^2} \tag{6}$$

where m/z the ion mass-to-charge, and $R_i$ the circumscribed radius of the rods. As long as the potential of a quadrupole ion guide is described by Eqns. (3) and (4), whether an ion of particular m/z passes between rod segments 36 of each stage 34 of ion guide 12 is primarily determined by the respective a and q value of Eqns. (5) and (6). An ion that passes between the rods is said to be stable.

Figure 4:
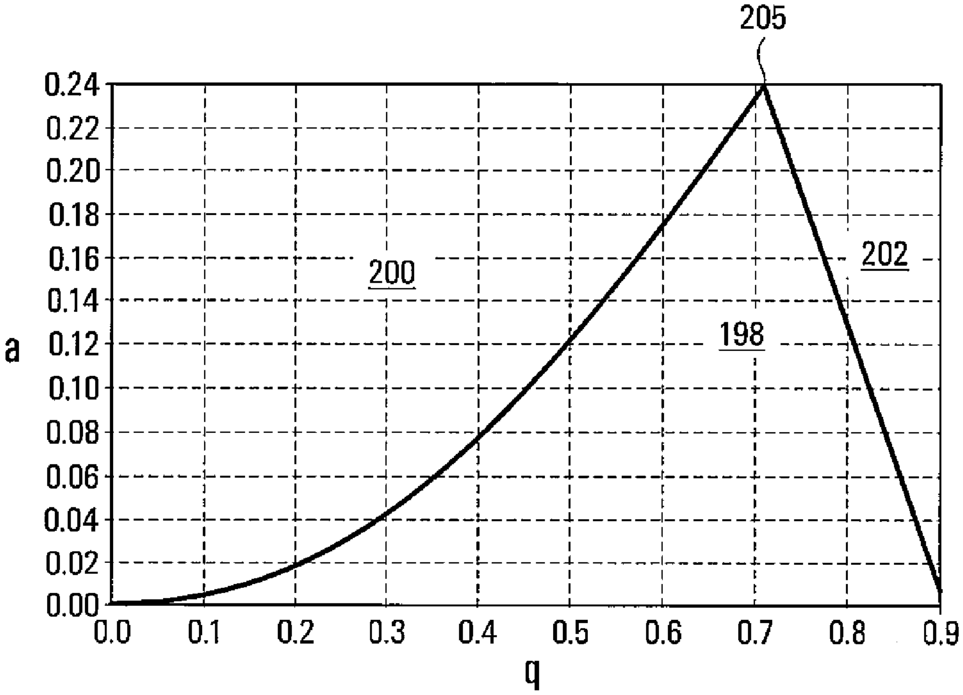
FIG. 4 is a diagram of the region of stability for a quadrupole ion guide.

FIG. 4 depicts the well-known Mathieu stability diagram with a stability region 198 bounded by instability regions 200 and 202 for various values of a and q. Ions in ion guide 12 having a, q values in stability region 198 are transmitted through the quadrupole mass filter, while those with a, q values outside these boundaries develop unstable trajectories and strike the rod segments 36.

Figure 5:
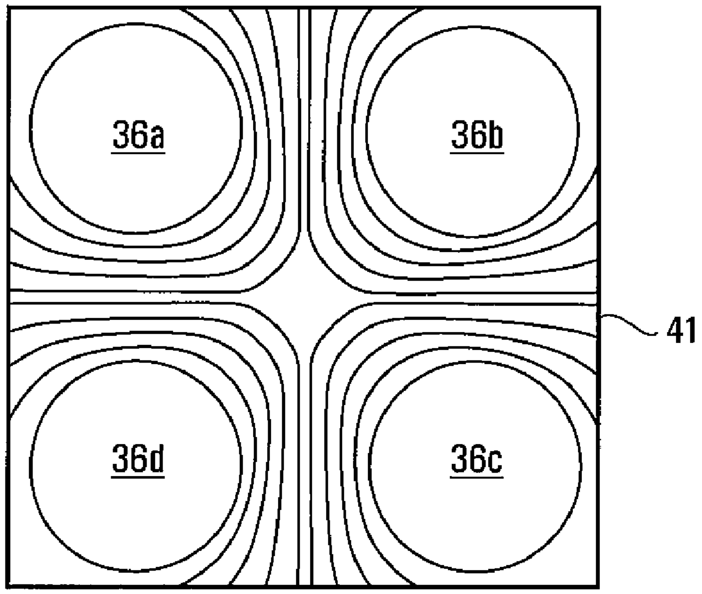
FIG. 5 is a cross-sectional view of the ion guide of FIG. 2, illustrating lines of equal potential.

For exemplary ion guide 12 of FIG. 2, rod segments 36 are constructed as four round rod segments 36 to yield an approximately hyperbolic potential according to Eqns. (3) and (4), in order to permit m/z selection capabilities. Ignoring edge effects at stage boundaries, Eqns. (3)-(6) and regions 198, 200 and 208 apply separately to one or more stage 34 of multistage ion guide 12. Potential of Eqn. (3) is approximated by adjusting $r_i/R_i$ of rod segments 36. In practice the useful $r_i/R_i$ of round rod segment 36 of FIG. 3 is approximately 1.12-1.15 and may be substantially constant for at least two stages, and possibly for all stages as depicted. Spatially, the applied voltage across rod segments 36*a*-36*d* and 36*c*-36*d* generates essentially hyperbolic equipotential 41, as depicted in FIG. 5.

Optionally, rod segments 36 may be machined to yield hyperbolic surfaces on at least a portion of rod segment 36, to provide the potential of Eqn. (3). However, it is substantially less costly to use round rods.

Further, optionally, the ratio $r_i/R_i$ of round rod segment 36 may be set to values other than 1.12-1.15. However m/z selection capabilities may be limited.

Figure 6:
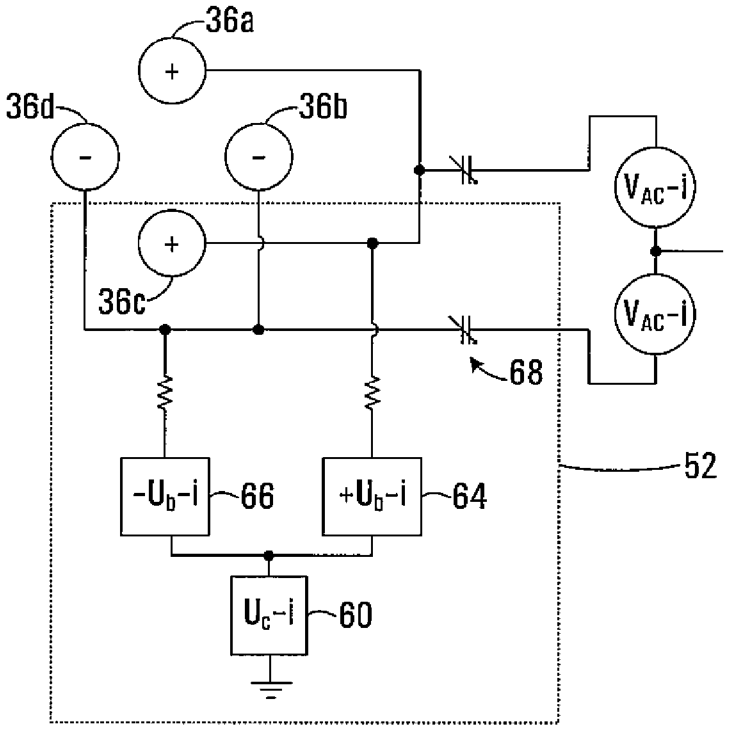
FIGS. 6-7 are simplified schematic diagrams of a power supply of the ion guide of FIG. 2.

In the exemplary ion guide 12, an alternating voltage $V_{ac}$-i is applied to opposing rod segments 36*a* and 36*c* within a stage and a voltage 180° out of phase, $-V_{ac}$-i is applied to opposing rod segments 36*b* and 36*d* within that stage, by voltage sources 52-*i*, as shown in FIG. 6. The voltage across adjacent electrodes is thus $2V_{ac}$-i. Resolving voltage of Eqn. (4) $U_b$-i, may also applied to opposing rod segments 36*a* and 36*c* within a stage and $-U_b$-i 36*b* and 36*d* within that stage, also by voltage sources 52-*i*. A static DC voltage $U_c$-i may be applied to all four segments 36, also by voltage sources 52-*i*.

More generally, for 2n rod segments, voltage sources 52-*i* may optionally supply RF voltage $V_{ac}$-i of opposite phase across adjacent rods of the 2n rod segment. Similarly, static voltage $U_c$-i may be applied, and resolving voltage $+/-U_b$-i (i.e. with potential difference $2U_b$-i) may also be applied.

Generally, in the stability region, the applied voltage Vs and frequency Ω confine the ion beam within about 0.8 $R_i$ (as in Gerlich, supra) along guide axis 38. As $R_i$ decreases, as shown in FIGS. 1 and 2, the radius of the ion beam $R_e$ decreases. In the case where the ion secular frequency ω is a large fraction of the ion fast micromotion Ω, for example for q<0.4 for a quadrupole ion guide, the ion motion approximates simple harmonic about axis 38 within a pseudo-potential well of depth <D> (as in Dehmelt, H. G., Advances in Atomic Physics 3 (1967) 53; and Dawson, vide supra). In the absence of a resolving DC voltage ($U_b$) and space charge, the ions experience a restoring force with a drive toward guide-axis 38. Well depth <D> is proportional to the product of Mathieu parameter q and RF voltage $V_{ac}$, and is estimated by $$<D> = \frac{zV_{ac}^2}{8mR_i^2\Omega^2} \tag{7}$$

The well is deeper for smaller $R_i$, larger RF voltage $V_{ac}$ and higher RF frequency Ω. Resolving DC amplitude $U_b$-i, as well as space charge, tends to reduce well depth <D>. A complete expression for multipoles, also including the effect of $U_b$-I, is given by Gerlich. As the ions experience collisions with the background gas through the second region of a lower pressure 13 they undergo momentum transfer with the background gas. Those collisions that reduce the translational energy of the ion serve to reduce the overall amplitude of the ion motion, confining the ions closer to the axis 38, thereby further reducing the ion beam radius. Increasing the well depth by adjusting $R_i$, $V_{ac}$ and Ω promotes further concentration near the axis 38.

The length $l_{stage}$-i of each stage 34 and the length of associated rod segment $l_{rod}$-i may vary from stage to stage and is on the order of 2-5 cm, although different lengths typically >1 cm are suitably long to allow travelling ions to experience enough cycles in the field to establish ion secular frequency, typically 5-10 cycles in the RF field, as the ions travel along axis 38 of each stage 34. For example, an ion of 60 Da with 0.05 eV kinetic energy might experience approximately 10 cycles in a 1 cm long 500 KHz RF field, depending on the operating pressure and buffer gas. Variable length $l_{stage}$-i allows adjustment of the time an ion spends within a particular stage 34, and is useful for, including but not limited to, controlling well depth, ion density distribution, and space charge along guide axis 38.

Referring again to FIG. 2, stages 34 are spaced with gaps 50, typically 0.5 mm-2 mm between each stage. This narrow gap size allows a nearly continuous field between the stages and minimizes scattering losses due to collisions with background gas. Preferably the gap is less than the mean free path of the ion in the background gas, although at high pressures the minimum spacing becomes limited by electrical factors. Gaps 50 may be air gaps, or filled with a suitable electrical insulator.

For rod segments 36 with no DC on rods, a=0, ions whose q falls within roughly 0.05 and 0.9 are stable as illustrated in FIG. 4. This allows for a wide range of m/z that is transmitted. At sufficiently low pressure a, q can be set near tip 205 (near a=0.237, q=0.706) to transmit a narrow window of m/z, on the order of 1 Da. However at moderate pressures, scattering losses can occur. Conveniently, at moderate pressures, the Mathieu parameter a can be advantageously set to lower values, typically between 0 and 0.1, and the a and q values can be selected to provide functions using rod segments 36 of one or more stages 34 including but not limited to: mass-to-charge ejection, transmission, or separation; reduction of chemical background or unwanted ions; and to induce fragmentation near boundaries 202 or 204.

Conveniently as well, other forms of excitation can allow selection of ions of specific m/z ratios. Thus, one or more auxiliary frequencies $\omega'_i$ can be can be added to the RF ion guide frequency Ω, and selected to resonantly excite one or more ions of mass-to-charge $(m/z)_i$ oscillating at frequency $\omega_i$ (as in Practical Aspects of Ion Trap Mass Spectrometry: Volume 2: Ion Trap Instrumentation). The frequency of ion motion $\omega_i$ in each stage 34 of ion guide 12 is given by:

$$\varpi_{i,x} = \frac{\beta_{i,x}\Omega}{2}; \tag{8}$$

$$\varpi_{i,y} = \frac{\beta_{i,y}\Omega}{2} \tag{9}$$

where $\beta_i$ is a coefficient of stability of ion of mass-to-charge i (only ions within $\beta_x<1$ and $\beta_y>0$ are stable) and Ω the radial frequency 2πf. The ion fundamental frequency βx, βy is given by a series expansion in a and q but can be approximated, for β<0.6 as, $$\beta_{i,x}=\sqrt{\left(a_x+\frac{q_x^2}{2}\right)} \quad (10)$$

$$\beta_{i,y}=\sqrt{\left(a_y+\frac{q_y^2}{2}\right)} \quad (11)$$

For a=0 the motion in the x and y direction is the same, so that $$\beta_{i,x}=\beta_{i,y}=\sqrt{\frac{q_i^2}{2}}) \quad (12)$$

$$\varpi_i=\frac{q_i\Omega}{2\sqrt{2}} \quad (13)$$

Auxiliary excitation can be used to selectively excite ions of a particular m/z in one or more stages 34, for a≧0, q>0, for purposes of, for example, collision induced fragmentation, mass filtering, and the like.

Figure 7:
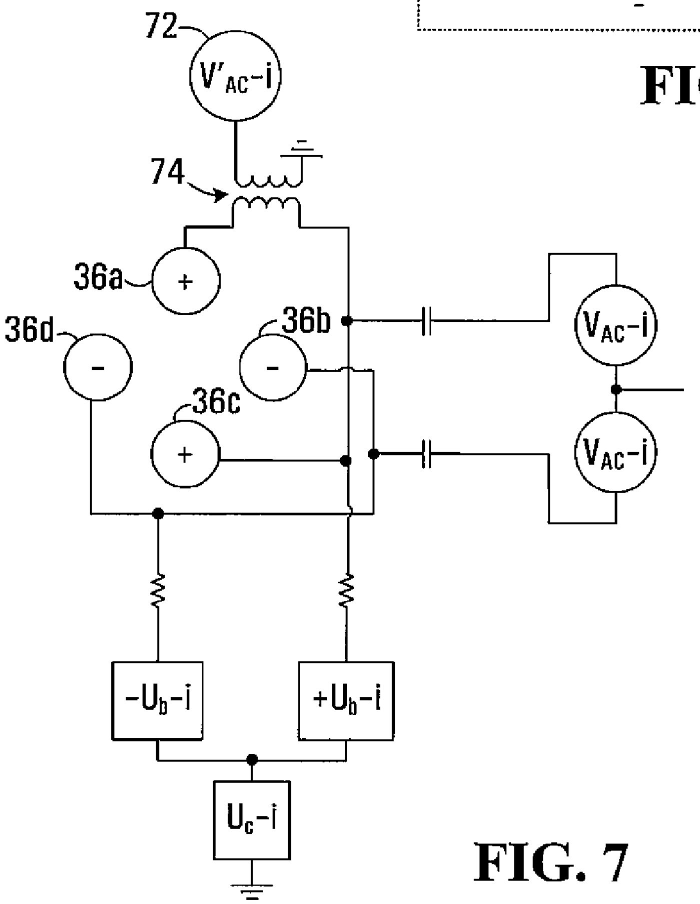

An example arrangement of voltage sources 52 and their interconnection with rod segments 36*a*, 36*d* and 36*b*, 36*d* of one stage 34 of ion guide 12 is illustrated in FIGS. 6 and 7.

As will become apparent, each voltage source 52 providing $V_s$-i may be formed of multiple voltage sources 54, 60, 64, 66, 72, providing independently adjustable or controllable voltages $V_{ac}$-i, $U_c$-i, $U_b$-i, $-U_b$-i, $V'_{ac}$-i respectively, as detailed below. Voltage source 52 and voltages $V_{ac}$-i, $U_c$-i, $U_b$-i, $-U_b$-i, $V'_{ac}$-i may be controlled by computing device 24.

As illustrated in FIG. 6, a source 54 applies an alternating voltage $V_{ac}$-i across electrodes 36*a* and 36*d* and electrodes 36*b* and 36*c*, at a frequency $\Omega_i$. The voltage applied across electrodes 36*a* and 36*d* is 180 degrees out of phase with that applied to electrodes 36*b* and 36*c*. The phase shift may be accomplished in any number of ways understood in the art, such as passing an alternating voltage through an inverting amplifier (not shown). The voltage $V_{ac}$-i is selected for a desired mass-to-charge range of ions of interest, according to Eqn. (6) (supra), a desired well depth Eqn. (7) (supra), and ion oscillation frequency $\omega_i$ Eqns. (8-13) (supra).

A further rod-bias source 60 is connected between node 62 and ground, providing a DC potential $U_c$-i to the electrode 36*a*, 36*d* and 36*b*, 36*c*, to control the potential along guide axis 38, as illustrated in FIG. 6. $U_c$-i is typically varied to aid in extraction from stage to stage, or it may be constant When it is varied, the potential difference $U_c(i+1)-U_c$-i, $\Delta U_c$, provides a DC field along the guide axis 38. Low fields gently transport ions to the exit of ion guide 12. Stronger electric fields can be used to fragment ions between gaps 50. The polarity of $U_c$-i is adjusted such that the ions of either polarity (negative or positive) experience a net attractive force from stage i to stage n, for example negative ions experience a positive $\Delta U_c$ and positive ions experience a negative $\Delta U_c$.

Positive and negative DC voltage sources 64, 66 provide potentials $+U_b$-i and $-U_b$-i to electrodes 36*a* and 36*c* and electrodes 36*b* and 36*d*, respectively, decoupled from $V_{ac-i}$ by capacitors 68. Capacitors 68 may be variable to adjust the relative amplitude of $V_{ac}$-i provided by alternating voltage source 54 to electrodes 36*a*, 36*c* and 36*b*, 36*d*, and thus the RF balance on axis 38. Resistors 70 serve to reduce the RF current flow to supplies 66 and 64.

$U_b$-i and $-U_b$-i may be precisely controlled for additional precision of the formed field. $+/-U_b$-i act as a resolving potential, and thus allow ion guide 12 to function as a coarse mass filter, according to Eqn. (4) and (5) and FIG. 4. DC amplitude $U_b$-i is set to transmit desired mass-to-charge range of ions, and may be set to zero. Stable ions will pass to the next stage of the ion guide without colliding with rod segments 36. The DC amplitude $U_b$-i is proportional to the AC amplitude $V_{ac}$-i and the ratio $U_b$-i/$V_{ac}$-i typically does not exceed 0.325 and is typically much lower. The $U_b$-i also contributes to well depth (as in Gerlich, supra) and ion oscillation frequency $\omega_i$ Eqns. (8-13) (supra).

As depicted in FIG. 7, a supplemental voltage source 72 may provide $V'_{ac}$-i at one or more frequencies $\omega'_i$ of variable amplitude, superimposed on $V_{ac}$-i by source 54 using transformer 74. Supplemental frequency $\omega'_i$ may be set to excite one or more particular ions of mass-to-charge m/z, or a range of ions of a range of mass-to-charge values, within quadrupole stage 34 via resonant excitation of ion oscillation frequency ω in Eqn. (11). Source $V'_{ac}$-i 72 outputs one or more components of frequencies $\omega'_i$ tuned to excitation frequencies ω. Multiple frequencies $\omega_1, \omega_2, \omega_3 \ldots \omega_n$ can be used to excite a range of mass-to-charges. Supplemental voltage source 72 is applied in a dipolar manner across rod segments 36*a* and 36*c*, although quadrupolar excitation by way of voltage applied in a quadrupolar manner is also possible, as known in the art.

The auxiliary frequencies $\omega'_i$ can be added to $V_{ac}$-i for mass-to-charge selective excitation, including but not limited to collision-induced dissociation. For example, when supplemental voltage source 72 is applied, ions entering ion guide 12 experience a combination of an RF confining field and a weaker AC excitation field. The AC excitation frequency $\omega'_i$ may be set to resonantly excite one or more ions of a particular mass-to-charge, causing these to acquire significant kinetic energy. Upon colliding with buffer gas, this energy is transferred into the bonds of the ions and they may fragment, and the fragments may be detected by a second mass analyser (not shown). The analysis of the fragments provides structural information, for example the qualitative analysis of a peptide chain, or quantitation, as an additional stage of specificity to reduce the chemical background.

The shapes of applied voltages are the essentially the same for all stages 34, but in general the amplitudes and frequencies of the applied voltages and resulting fields may vary. Separate voltage sources or a single, interconnected voltage source may be used to provide voltage source 52 to each of the segments 36 whose frequency and amplitude ($V_{source-AC}$) may be varied, and $+/-U_b$-i and $U_c$-i to each of the segments 36, whose DC amplitudes may be varied.

Optionally $U_c$-i for at least one of stages 34 exceeds the kinetic energy of the ions guided along guide axis 38, providing an energy barrier in the proximity of the gap between said one of said stages. For example, $U_c$-i for the last (i.e. $n^{th}$) one of stages 34-*n* may exceed the energy of the ions guided along guide axis 38, unenergized ions are repelled back toward axis 38, in the vicinity of the entrance of this last stage 34-*n*. The exact location depends on the extent of applied voltage. Alternatively, $U_c$-i for the $(n-1)^{st}$ stage 34-$(n-1)$ exceeds the energy of the ions guided along the guide axis, in order to trap the ions in the proximity of the $(n-1)^{th}$ one of the n stages.

Figure 8:
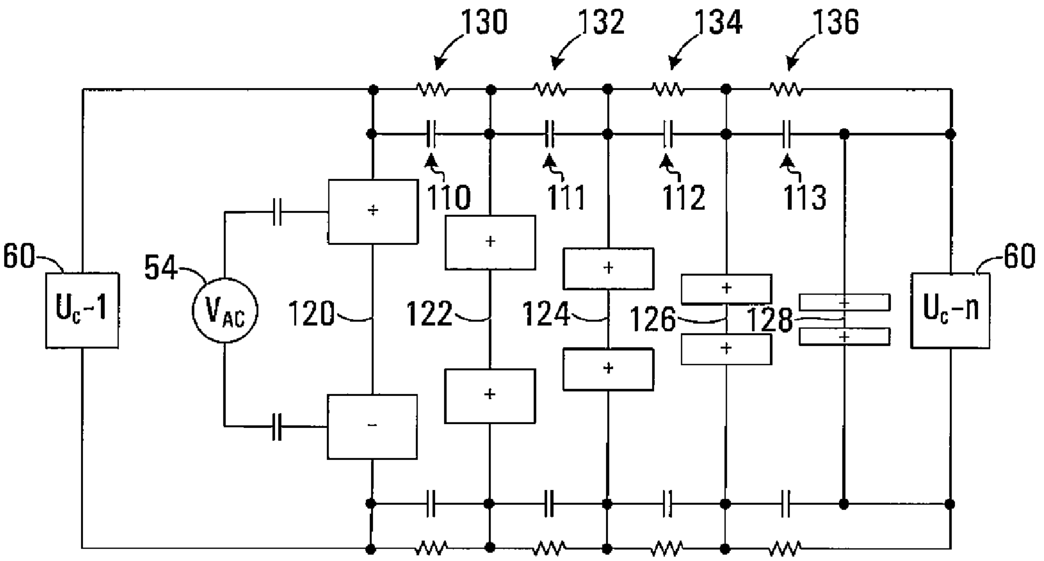
FIG. 8 is a simplified schematic diagram of yet another ion guide, exemplary of another embodiment of the present invention.

As will be appreciated by those skilled in the art, AC sources 54 and DC sources 60 for all n stages 34 may be combined by one or more equivalent voltage sources to provide voltages to all stages 34 as depicted in FIG. 8. AC source 155 is interconnected with stages 34 by way of capacitors 110-113 to apply a time varying voltage across rod segments 36*a* and 36*d* and 36*b* and 36*c* of each stage. The AC frequency is constant and the AC amplitude decreases across the segments. The two rod pairs of each segment 120 to 128 contribute capacitance, creating an equivalent circuit containing the rod segments 36 as extra capacitors. For the case where the impedance $Z_i << R_i$ the net equivalent circuit becomes $$V_n = V_{n-1}\left(\frac{C}{C_n + 2C_{eqn}}\right) \tag{14}$$

where $$C_{eqn} = C_m + \left(\frac{C_{n+1}C_{eqn+1}}{C_{n+1} + 2C_{eqn+1}}\right) \tag{15}$$

$V_n$ and $C_n$ is the voltage and capacitance, respectively across segment n and n−1, and $C_n$ is the rod capacitance for segment n. DC voltage sources 160 can be provided via dividing resistors 130 to 136 as shown or can be driven independently for each segment, or a combination of both approaches can be used.

In operation, ion source 14 depicted in FIG. 1, produces ionized particles at or near atmospheric pressure. Ions and gas are sampled through orifice 78 into lower pressure interface 16. Vacuum pump 28 maintains the pressure at interface 16 at about 1-10 Torr. The ions are entrained in a flow of gas, either through free jet expansion, laminar flow, or some other means, and are transported through orifice 80 into ion guide 12. The pressure differential between pressure near orifice 80 and region 13 creates a flow. Collisions in the flow cause entrainment of ions as they enter ion guide 12. Eventually, the pressure reaches equilibrium with the background gas in region 13. Within ion guide 12, voltage sources 52 produces varying electric potentials $V_s$-i as detailed above across adjacent rod segments 36 within each $i^{th}$ stage 34 of guide 12.

In the exemplary embodiment of FIG. 1, ions and gas are sampled through a 600 μm orifice 78 into interface 16, a heated laminar flow interface, evacuated by a roughing pump. An equilibrium pressure is obtained in region 82 of approximately 2 Torr. Ions are directed through orifice 80 (typically 5 mm) by a combination of gas flow and electric fields due to voltages applied to interface 16, toward axis 38 and ion guide 12. Ions that are initially entrained in the gas enter stage 34-1 of ion guide 12. The radius $R_i$ is sufficiently large that the ions do not strike rod segment 36 of stage 34-1. Evacuated by a 600 l/s pump, region 13 pressure drops along axis 38 from approximately 1-2 Torr near orifice 80 to hundreds of mTorr near the entrance 84 of guide 12, stage 34-1 of FIG. 2 to tens of mTorr with 30-40 mm of transit, in stage 34-3 to an equilibrium pressure of about 5-10 mTorr within 50 mm of ion guide 12, stage **34-*n***.

For the exemplary four segments 34-1 of ion guide 12, $R_1$ is 8 mm, $R_2$ is 6 mm, $R_3$ is 4 mm and $R_4$ is 3 mm.

The AC potential applied to rod segments 36 provides a quadrupolar field to contain the ions initially at a distance roughly $2R_i$ about guide axis 38 at the entrance of guide 12. In the exemplary embodiment, the ratio $V/R_i$ is adjusted for each segment such that as $R_i$ decreases the pseudo-potential well depth increases by a preselected amount, for example by a factor of 4, from approximately 20 eV near the entrance of guide 12, stage 34-1 to 80 eV near of ion guide 12, stage **34-*n***. In this way, the AC potential can be adjusted for maximum transmission, minimizing ion losses, yet remain sufficiently low as to minimize electrical effects such as discharge, creep, and the like.

As $R_i$ decreases for each subsequent stage 34, guide 12 progressively concentrates ions in a beam along axis 38. Collisions in combination with the AC field reduce the effective radius by reduction of the axial and radial kinetic energy of the ion beam. Since the well depth is increasing for each segment 36 there is a further net additional radial reduction as they are transported to the exit of ion guide 12. At the conclusion of n stages of guide 12, the stream of ions has been concentrated in a stream having a diameter substantially less than about $2R_n$ and near thermal energy.

DC voltage $U_c$-i is varied across the segments to provide potential differences along the axis 38. The pressure gradient generated by vacuum sources 28 and 30 and an axial field resulting from the applied $U_c$-i cause ionized particles to be accelerated along axis 38 to mass filter **20*a***.

The geometrically similar (and typically identical) field patterns in the $i^{th}$ stages **34-*i* (as caused by generally constant $r_i/R_i$) for the stages minimizes transmission loss from stage to stage. The Mathieu parameter q and the well depth are controlled so that ion motion incrementally changes as ions are transported from a region of lower q to a region of higher q, with a gradual change in secular frequency. Similarly, the relative small gap between adjacent stages 34** facilitates passage of ions from section to section.

Exiting ions are next passed orifice 86 (having about 1 mm) into quadrupole mass filter **20*a* of analyser region 18 with a pressure of about $1e^{-5}$ Torr, pumped by 300 l/s. The resolving DC and AC voltages applied to quadrupole mass filter 20*a* acts as a notch filter for a selected range of mass-to-charge values. Transmitted ions successfully pass through filter 20*a* are accelerated to a lab frame translational energy of typically 30-70 eV into collision cell 21, pressurized to induce fragmentation. Fragment ions are then transmitted through quadrupole mass filter 20*b*, impacting detector 22**.

Computing device 24, in turn, may record the applied voltage to filter **20*a* and 20*b* (and thus the mass to charge ratio of the ions passed by filter 20*a* and 20*b*), and the magnitude of the signal at detector 22. As the applied voltages to filter 20*a* and 20*b*** are varied, a mass spectrum may be formed.

Conveniently then, each of multiple stages **34-*i* allows for the generation of a generally quadrupolar (or other polar) electric field for guiding ions along guide axis 38, having field characteristics that are independent of the electric field characteristics in an adjacent stage. At least one of amplitude, or frequency of the electric field within each stage, may vary from the amplitude, or frequency, of an adjacent stage. Further, an additional DC field (generated by Ub) may be applied generally perpendicular to the guide axis 38. Similarly, an additional alternating field component having frequency $\omega_i$ may be applied in a plane generally perpendicular to the guide axis 38. This allows each stage 34-*i* to provide a separate, independent, function along the ion path through ion guide 12. For example, each stage 34-*i* may be configured to provide an independently selected well depth, Mathieu parameter q; auxiliary frequency; resolving DC voltage; and/or axial field DC voltage. For example, the first stage 34-1 of multiple stages 34-*i* may serve to capture an ion beam at a set well depth and q; the second stage 34-2, at a different well depth and q, may serve to cause dissociative excitation or ejection of unwanted ions, and the next stage 34-3 may serve to better confine the wanted ions. Conveniently, rod segments 36 of each of the multiple stages are arranged circumferentially about the guide axis at radial distance $R_i$. The radial distance of the rods 36 for each stage 34-*i* progressively decreases from inlet to outlet of guide 12. In this way, ions may enter the stream loosely entrained in a stream of gas, and be concentrated as they pass from stage to stage of guide 12**.

Further, adjacent stages 34-*i* are sufficiently close to each other so that the field continues to guide the ions along axis 38.

Thus, optional modes of operation may be used to further improve sensitivity and functionality of ion guide 12.

For example, in order to trap ions, computing device 24 may apply a repelling DC voltage $U_c$-i to the first stage 34-1 and the $n^{th}$ stage **34-*n* of FIG. 2 to provide a kinetic energy higher than the energy of the ion beam, $U_c$-(n−1). Ions are thus stored for a period of time within segments 36-2 to 36 n+1. After some time τ, $U_c$-(n−1) is decreased and ions are released into a mass analyser region 16**.

Supplementary AC voltage may also be applied to one or more segments simultaneously to excite one or more mass-to-charge ranges of ions, while the ions are trapped or flowing through ion guide 12. More specifically, voltage source 52 provides one or more further additional AC components having a frequency $\omega'_i$ applied between the plurality opposite elongate rods 36 preselected to excite one or more $\omega_x$ or $\omega_y$ as defined by Eqn. (10), causing ions to resonate according to their secular frequency ωi. The AC amplitude of the $\omega_i$ component may be zero for one or more multiple stages 34 and is variable, to provide, including but not limited to, mass-to-charge-selective excitation, fragmentation and ejection.

So, optionally, ions may be mass selectively ejected, transmitted or fragmented at a boundary of one stage 34. It is sometimes preferable to provide a form of mass-to-charge selective ejection by guide 12 to reduce duty cycle losses in mass spectrometer 10. For example, an ion beam can be concentrated according to mass-to-charge ratio, using mass-to-charge selection methods. For example, ions of a particular range of mass-to-charge ratios may be transmitted to the analyser, while remaining analyte ions are stored, and undesired ions are removed. It is also sometimes preferable to energize and fragment or eject a set of ions that may cause chemical background, at various mass-to-charge values in order to prevent their transmission, thereby improving the signal-to-noise ratio of the transmitted beam.

Optionally voltage source 52 on ion guide 12 is operated such that the Mathieu parameter q is set to be substantially constant for some or all of the n stages 34. This is achieved by maintaining the ratio $V_{ac}/r_i^2\Omega_i^2$[z/m], specifically by applying the appropriate AC amplitude $V_{ac}$ or AC frequency Ω to each stage. Nearly constant q is useful for purposes including but not limited to: exciting an ion of m/z with the same auxiliary frequency across multiple stages 34; minimizing perturbations in ion motion in regions of high gas flow, to reduce losses; establishing a drift time essentially by the applied DC electric field; and minimizing axial trapping that may be induced at small $R_i$.

Further, an optional DC resolving potential $U_b$-i applied to adjacent rods of each stage cause guide 12 to act as a coarse mass filter, by causing ionized particles having mass-to-charge ratios outside the stability region to collide with the rod segments 36, or cause boundary activated fragmentation or mass selective ejection with a≠0.

Further, one or more of AC voltage $V_{ac}$ and AC frequency Ω of voltage source 54 may be switched to provide equal or variable well depth by adjusting the ratio $V^2_{ac}/r_i^2\Omega_i^2$[z/m], by applying the appropriate $V_{ac}$ or AC frequency Ω to each stage. For example, it can be advantageous to capture ions using a selected well depth, excite them using selected q, and eject them at another selected well depth. To do so, ion guide 12 collects ions from large orifice 84 with voltage source 52 set to capture and confine ions using a pre-selected well depth and AC voltage $V_{ac}$-i. A repulsive DC potential may be applied to last stage **34-*n* by switching $U_c$-n 60. $\pm U_b$n 64 and 66 are set to zero. $U_c$-1 on stage 34-1 is switched repulsive, trapping ions between stage 34-1 and stage 34-*n*. AC voltage $V_{ac}$-i is switched to yield constant q. AC source $V_s$-i applies supplemental voltage $V_{ac}$-i at frequencies $\omega_i$ to stages 34-2, . . . , 34-(*n*−1). This creates a further alternating electric field perpendicular to guide axis 38, to selectively excite ions of particular corresponding mass to charge ratio and collide with rods 36. By using multiple ωs, either in time or in different stages, ions of undesirable mass-to-charge ratios may be removed from guide 12, and ions of desired mass-to-charge ratios may be isolated. Once ions of desired mass-to-charge ratios are isolated, Uc-n for stage 34-*n* may be reversed to release the ions from ion guide 12**.

$U_c$-i for the various stages may also provide a DC electric field gradient to separate ions in time and perform ion mobility studies. In order to do so, one of stages **34-*i* is initially used as a gate stage to prevent the flow of ions to subsequent stages. To do, an appropriate $U_c$ is applied to the gate stage to repell ions. This prevents ions from passing through the gate stage. Thereafter this voltage is removed for a short period of time, allowing ions to pass through the gate stage for that period of time. As a result, a small packet of ions passes to subsequent stages, and DC voltage $U_c$-i for subsequent stages provide the potential difference and electric field along the axis 38. The DC field resulting from the applied $U_c$-i causes ionized particles to be accelerated along guide axis 38, proportional to the mass of the ions. As well, ions collide with the background gas, and ions of different molecular structures have different collision rates and collision cross sections, with the background gas (as discussed in: EA Mason and E W McDaniel: Transport Properties of Ions in Gases (Wiley, New York, 1988)). After some drift time $t_D$, depending on the molecular structure of the ion, exit stage 34-*n* and enter mass analyser region 16**. Molecular ion drift $t_D$ time in a drift field E of electric field strength is $$t_D = \frac{L}{K_o E}\frac{P}{760}\frac{273.2}{T} \tag{16}$$

where E is the electric field strength, P is the buffer gas pressure, L is the distance between the gate stage and the exit of exit stage **34-*n*** of the ion guide, and T is the buffer gas temperature, and $K_o$ is.

$$K_o = \frac{\sqrt{18\pi}}{16}\frac{z_e}{\sqrt{k_b T}}\sqrt{\frac{1}{m_i}+\frac{1}{m_b}}\frac{1}{\Omega' N} \tag{17}$$

where $z_e$ is the ion's charge, $k_b$ is Boltzmann's constant, $m_I$ and $m_B$ are the masses of the ion and buffer gas, and N is the buffer gas number density. Gaps 50 provide for minimum fringe field distortion between each stage 34. The geometry of ion guide 12, including gap 50 and constant $r_i/R_i$ provide for well-defined 1/E thereby making it possible to obtain a well defined $t_d$, and potentially an accurate measure of the collision cross section Ω'.

When using spectrometer 10 of FIG. 1, ion guide 12 can function as an ion mobility separator, a crude mass filter, a noise eliminator, while concentrating the beam, providing improved signal-to-noise. Mass selective ejection can further improve the sensitivity, by reducing duty cycle losses in combination with mass analysis, especially when there are many masses to analyse (tens or hundreds). Alternative mass selective excitation and ejection can be employed in any of the embodiments.

Figure 9:
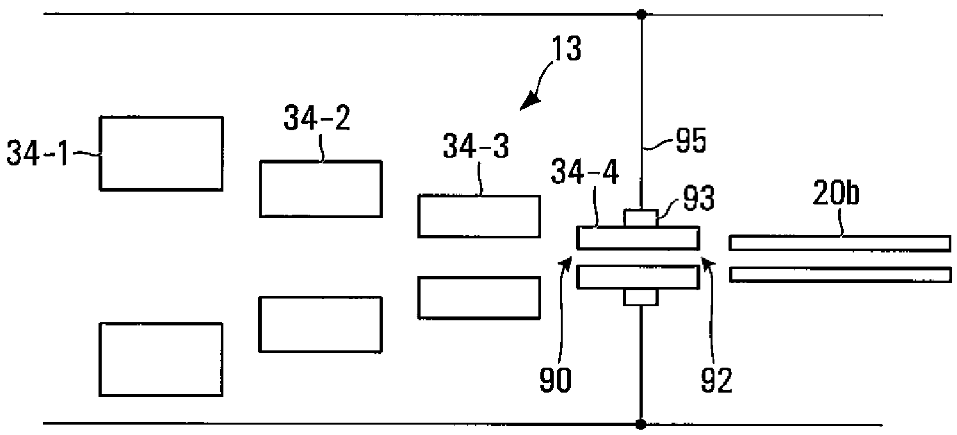
FIG. 9 is a simplified schematic diagram of yet another ion guide, exemplary of another embodiment of the present invention.

Now, it will be appreciated that multiple embodiments using guide 12 are possible. For example, FIG. 9 depicts an alternative embodiment of ion guide 12 in which entrance 90 and exit 92 of 34-*n* replace aperture 86 to separate two pressure regions 13 and 18. Insulator 93 provides electrical isolation between ion guide 34-*n* and vacuum partition 95. Stage 34-4 serves as an exit for ions being transported to analyser 20*b*.

Figure 10:
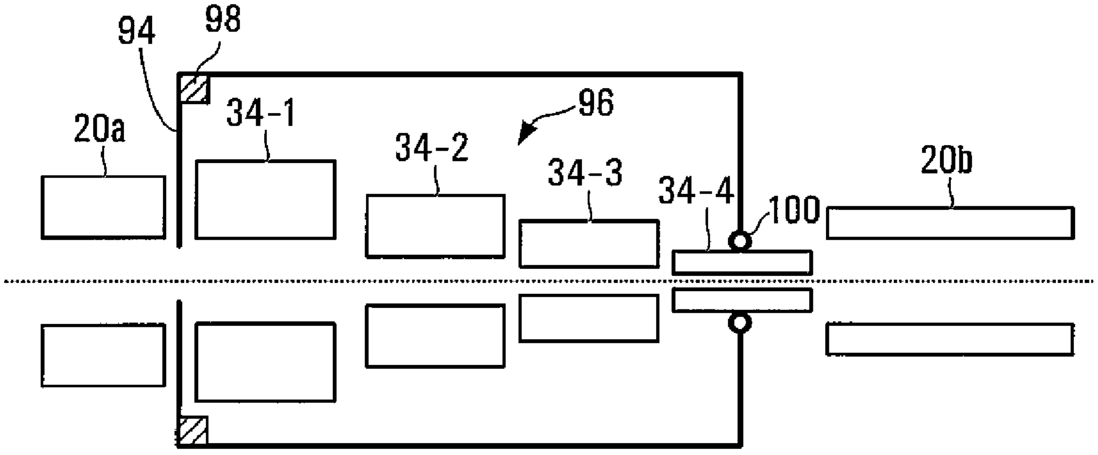
FIG. 10 illustrates an alternate mass-spectrometer including the ion guide of FIG. 2.

It will be apparent to those skilled in the art that ion guide 12 can advantageously replace conventional ion guides as collision cells, such as collision cell 21 of spectrometer 10. Depicted in FIG. 10 is an enclosed version of ion guide 12 replacing a conventional ion guide of collision cell 21. Ions exiting filter 20*a*, essentially along axis 38, are accelerated and focused through an aperture 94 electrically isolated via insulator 98 into enclosed volume 96 pressurized to several tens of mTorr. Ions that are scattered to large angles are captured by stage 34-1 without striking the rods. Fragment ion radial distributions are compressed and energy thermalized as they are transported from 34-2 to 34-4. Insulator 100 further electrically isolates segment 34-4, geometrically designed for a preselected flow conductance, or optionally a second aperture (like aperture 86) is used. The fragment ions are then efficiently transported then into analyser 20*b*. Scattering losses are reduced, and benefits of conventional ion guides are maintained.

Figure 11:
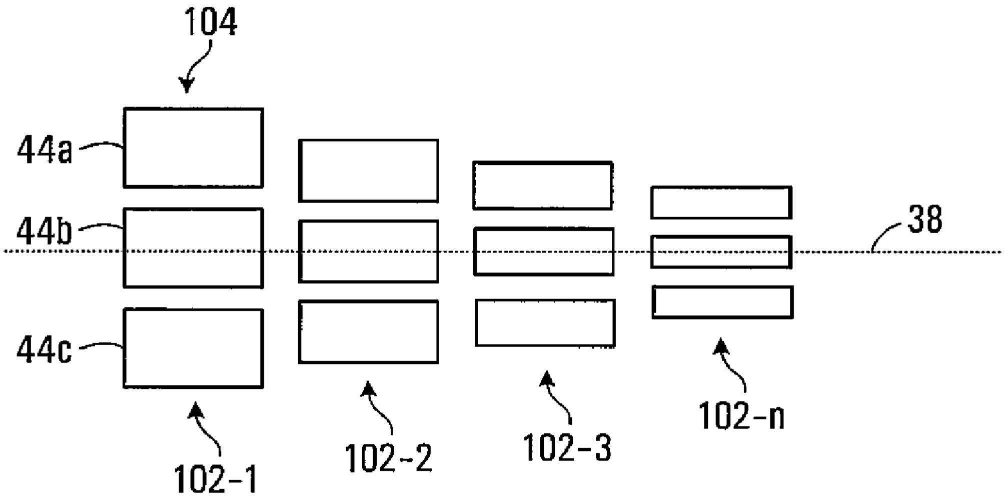
FIG. 11 is a simplified schematic diagram of yet another ion guide, exemplary of another embodiment of the present invention.

Optionally one or more stages 34 can be formed of a multipolar ion guide with 2n>2, in combination with a quadrupole ion guide. For example, in cases of very large beam diameters at the entrance aperture, it can be advantageous for the first segment 102-1 to be a hexapole ion guide 104 or an even higher order ion guide as depicted in FIG. 11.

Ions traversing axis 38 can be effectively captured by multipole RF ion guides of higher number of rods. This is in part due to a large effective acceptance aperture, on the order of $0.8R_i$ (Gerlich, pg. 38), where $R_i$ and $r_i$ are as defined in Eqn. (2). Optionally, then hexapole ion guide 102 may be used to capture larger incoming beam diameters than four rod segment 36 of ion guide 12, using similar $r_i$ and voltage requirements. However, the beam radius is reduced more effectively using lower n (Eqn. (7)). Therefore after the ions are captured in a gaseous flow by first segment 102-1 of ion guide 104, they may then preferably enter the following quadrupole ion guide stages 34-*n* of decreasing $r_i$.

For a given $R_i$, the required AC voltage on the rods is typically lower for higher n (Gerlich, for example pg. 42). Therefore optionally it is sometimes preferable to operate with a larger number of small diameter rods, achieving a similar acceptance aperture at lower AC voltage, for example to avoid discharge, etc.

Of course, the nature of the geometry of the rods will affect the nature of the field. In guide 104, rods 102 are angularly separated by 60 degrees about guide axis 38. The radius of rod electrodes is $r'_i$, and the circumscribed radius defined by rods 44 is $R'_i$. Exemplary $R'_i$ and $r'_i$s also may be in the range of about 2 mm to 30 mm with a ratio given by Eqn. (2). An alternating voltage $V_{ac}$-i is applied to opposing rods 44*a*, 44*c* and 44*d* and the rod opposing it (not shown) and a voltage 180 out of phase, $-V_{ac}$-i/ is applied to opposing rod electrodes 44*b*, 44*d* and 44*f*, such that the voltage across the two adjacent rod segments is $V_{ac}$-i.

More generally, a multipole includes 2n electrodes, angularly separated by an angle π/2n, with AC voltage of opposite phase applied to adjacent electrodes.

Figure 12:
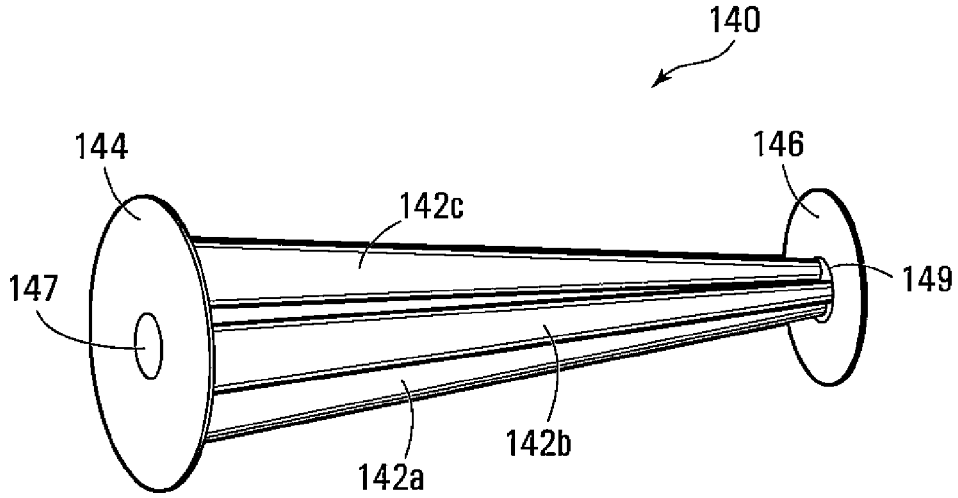
FIG. 12 is a perspective view of yet another ion guide, exemplary of another embodiment of the present invention.
Figure 13:
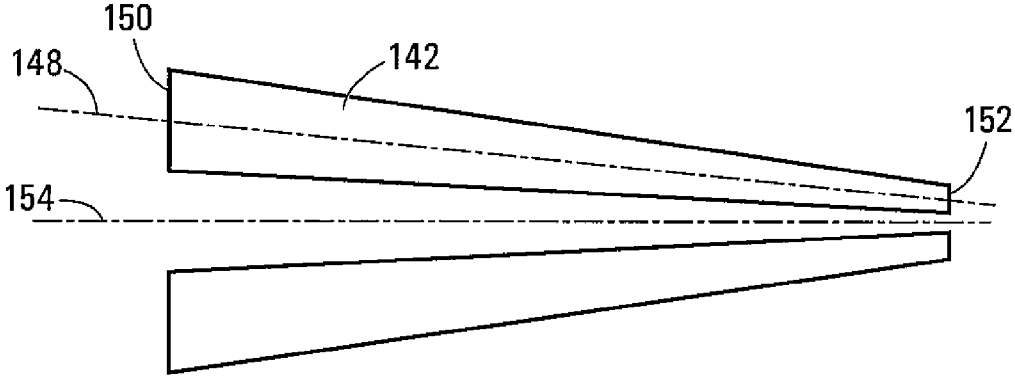
FIG. 13 is a schematic cross-section of the ion guide of FIG. 12.

As will now be appreciated, principles embodied in ion guide 12 may easily be embodied in different geometries understood by those of ordinary skill. To that end, FIGS. 12-13 illustrate alternative ion guide 140 formed of four continuous at least partially conductive guide rods 142*a*, 142*b*, 142*c* (only three are illustrated) (individually and collectively 142). Also shown are electrically isolated aperture lens endplates 144 and 146 with apertures 147 and 149. Each rod 142 is tapered and positioned at an angle such that it has a circular cross-section with respect to the axis 154, that is the plane of face 150 and 152 intersect at right angles axis 154, of radius r that varies linearly with length L Guide 140 has an opening thus at x=0, and an exit at x=L, and has non-circular (elliptical) cross section with respect to axis 148. In FIG. 13 rod 142, first parallel face 150 positioned at x=0 and is equal to 2r1 and second parallel face 152 positioned at x=L is equal to 2rn. Four rods 142*a-d* are arranged about axis such that r/R is constant along the length with centre 148 of face 150 offset from centre 149 of face 152 and axis 154 by $R_1+r_1-R_n+r_n$. For example, for L=150 mm, r1=16. r2=4, and r/R=1.14 along the length L, centreline 148 is angled 4.30° from axis 154.

Additionally, rods 142*a*, 142*b*, 142*c* and 142*d* are spaced so that the centre of the cross section of each rod 142 at any point lies on a circle having circular cross section of radius r with centreline r+R from axis 154. Moreover, rods 142 are arranges so that centres of each cross-section are equally spaced about guide axis 154.

Figure 14:
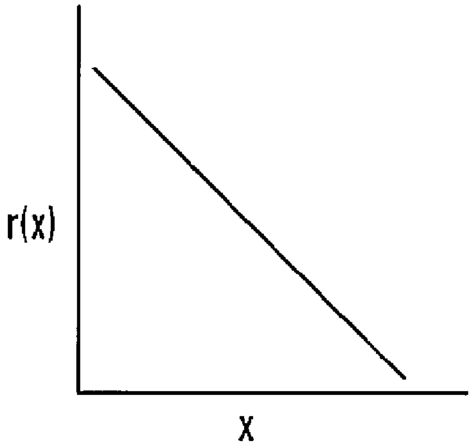
FIG. 14 is a graph depicting the radius of the ion guide of FIG. 13 as function of position (x) along its length.

FIG. 14 illustrates r(x) as a function of position x.

In operation, an AC potential is applied to ion guide 140 causing ion frequency to incrementally increase as r and R decrease.

Synchronized repelling voltages may further be applied to aperture lens endplates 144 and 146 in order to trap ions with ion guide 140 for a period of time before ejecting them through apertures 147 or 149.

The geometry of rods 142 can be constructed such that R and r can vary linearly or nonlinearly with x, with r(x) determining the shape of the rod, and r(x)/R(x) determining its angle with respect to the axis.

Rods 142 may be formed of semi-conductive or insulating material, so that a voltage $V_{source}$ applied to its ends (such as by voltage source 60) may produce a linear voltage gradient along the length of each rod 142.

That is $V(X)=x/I*V_{source}$.

$V_{source}$ may again have AC components at frequency Ω and optionally ω, as well as a DC component U, as described above. In this way, guide 140 may function in much the same way as guide 12. Again, voltage source 52 may be variable in frequency and amplitude.

Furthermore, ion guides 140 can be divided into segments and electrically interconnected as illustrated with reference to FIGS. 6-9, providing at least some of the above functionality and properties.

As such, guide 140 may be used in place of guide 12 in spectrometer 10, with its opening in communication with source 14 and its exit in communication with mass filters 20*b*.

A person of ordinary skill will now readily appreciate that the above described embodiments are susceptible to many modifications. For example, gaps between segments could be filled with an insulator. Alternative electrode shapes can be used. For example, the electrodes could be shaped as rectangular plates or otherwise along the guide axis, while r/R may be preserved as described.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of guiding ions of selected m/z ratios within an ion guide along a guide axis, said method comprising:

providing a plurality of guide stages arranged along said guide axis;

within each of said plurality of guide stages, generating an alternating electric field that guides said ions along said guide axis, and confines ions of selected m/z ratios within a radius about said guide axis in each of said stages, wherein the radius is sequentially reduced from stage to stage along said guide axis, and wherein at least one of the amplitude and frequency of said electric field within each stage, varies from the amplitude, frequency, and axial and resolving potential within an adjacent stage.

2. The method of claim 1, wherein said alternating electric field within each of said plurality of guide stages is a substantially quadrupolar electric field.

3. The method of claim 1, wherein said alternating electric field within each of said plurality of guide stages is a substantially hexapolar electric field.

4. The method of claim 1, wherein said alternating electric field within each of said plurality of guide stages is a substantially octopolar electric field.

5. The method of claim 1, wherein said alternating electric field within each of said plurality of guide stages is a substantially n-polar electric field, with n>4.

6. The method of claim 1, wherein said alternating electric field comprises first and second alternating components perpendicular to said guide axis.

7. The method of claim 1, further comprising generating an electric field in a direction parallel to said guide axis to guide ions from stage to stage.

8. The method of claim 7, wherein said electric field in a direction parallel to said guide axis spatially separates ions of different mass to charge ratios along said guide axis.

9. The method of claim 1 further comprising generating an electric field along said axis that prevent release of ions from said guide at a first time to, and releases ions from said guide at a second time.

10. The method of claim 1, further comprising generating a second alternating electric field in a direction perpendicular to said guide axis to excite ions of particular selected m/z ratio.

* * * * *